(12) United States Patent
Lofton et al.

(10) Patent No.: US 7,975,900 B2
(45) Date of Patent: Jul. 12, 2011

(54) IGNITION SOURCE SYSTEM FOR AN EXOTHERMIC REACTION MOLD DEVICE

(75) Inventors: David Lewis Lofton, Tulsa, OK (US); James Quintus, Springfield, MO (US)

(73) Assignee: Continental Industries, Inc., Tulsa, OK (US)

( * ) Notice: Subject to any disclaimer, the term of this patent is extended or adjusted under 35 U.S.C. 154(b) by 0 days.

(21) Appl. No.: 12/843,377

(22) Filed: Jul. 26, 2010

(65) Prior Publication Data
US 2011/0132967 A1 Jun. 9, 2011

Related U.S. Application Data

(63) Continuation-in-part of application No. 12/632,417, filed on Dec. 7, 2009.

(51) Int. Cl.
*B23K 3/00* (2006.01)
*F23Q 3/00* (2006.01)

(52) U.S. Cl. ........ 228/51; 228/234.3; 266/167; 361/247

(58) Field of Classification Search ........................ None
See application file for complete search history.

(56) References Cited

U.S. PATENT DOCUMENTS

| | | | | |
|---|---|---|---|---|
| 3,502,847 A | * | 3/1970 | Heide | 219/426 |
| 3,578,233 A | * | 5/1971 | Meister et al. | 228/5.1 |
| 4,062,485 A | * | 12/1977 | Andersen | 228/56.3 |
| 4,345,555 A | * | 8/1982 | Oshima et al. | 123/272 |
| 4,729,503 A | * | 3/1988 | Niinivaara | 228/18 |
| 4,885,452 A | * | 12/1989 | Amos et al. | 219/130.4 |
| 4,889,324 A | * | 12/1989 | Brosnan et al. | 266/157 |
| 5,145,106 A | * | 9/1992 | Moore et al. | 228/234.3 |
| 5,528,012 A | * | 6/1996 | Schlienger | 219/121.37 |
| 5,653,279 A | * | 8/1997 | Foutz et al. | 164/54 |
| 5,660,317 A | * | 8/1997 | Singer et al. | 228/44.3 |
| 5,715,886 A | * | 2/1998 | Fuchs | 164/54 |
| 5,829,510 A | * | 11/1998 | Fuchs | 164/54 |
| 6,206,718 B1 | * | 3/2001 | Takahashi et al. | 439/382 |
| 6,275,136 B1 | * | 8/2001 | Yamaguchi | 337/401 |
| 6,285,008 B1 | | 9/2001 | Fleetwood et al. | |
| 6,382,496 B1 | * | 5/2002 | Harger | 228/44.3 |
| 6,411,190 B1 | * | 6/2002 | Yamaguchi et al. | 337/401 |
| 6,483,420 B1 | * | 11/2002 | Takahashi et al. | 337/401 |
| 6,553,911 B1 | * | 4/2003 | Walker et al. | 102/202.7 |
| 6,776,386 B1 | * | 8/2004 | Morrissey et al. | 249/97 |
| 6,793,003 B2 | * | 9/2004 | Triantopoulos et al. | 164/349 |
| 6,835,910 B2 | * | 12/2004 | Moore et al. | 219/121.45 |
| 6,994,244 B2 | * | 2/2006 | Harger et al. | 228/234.3 |

(Continued)

FOREIGN PATENT DOCUMENTS

JP 58-011321 A * 1/1983

(Continued)

*Primary Examiner* — Kiley Stoner
(74) *Attorney, Agent, or Firm* — Head, Johnson & Kachigian, P.C.

(57) ABSTRACT

An ignition source system for an exothermic reaction mold device for welding conductors. The system includes a crucible in a block with an open top so that the crucible receives an exothermic weld material. The conductors to be welded exothermically are placed in the weld cavity of the mold. A lid covers the open top wherein the lid has an opening therethrough. An electronic thermal igniter assembly has an ignition component receivable through the opening in the lid so that the exothermic weld material may be ignited by the electronic thermal igniter assembly. The igniter plug rests on top of the lid and the ignition body is retained in a recess within the igniter plug.

18 Claims, 5 Drawing Sheets

U.S. PATENT DOCUMENTS

| | | | |
|---|---|---|---|
| 7,240,717 B2 * | 7/2007 | Lofton | 164/54 |
| 2001/0013534 A1 * | 8/2001 | Takahashi et al. | 228/178 |
| 2002/0104953 A1 * | 8/2002 | Triantopoulos et al. | 249/86 |
| 2003/0221578 A1 * | 12/2003 | Forman et al. | 102/202.7 |
| 2004/0222274 A1 * | 11/2004 | Harger et al. | 228/234.3 |
| 2005/0093412 A1 | 5/2005 | Lykowski et al. | |
| 2007/0017955 A1 * | 1/2007 | Siracki et al. | 228/2.5 |
| 2007/0107869 A1 * | 5/2007 | Lofton | 164/54 |
| 2009/0173873 A1 * | 7/2009 | Stidham et al. | 249/83 |
| 2010/0163607 A1 * | 7/2010 | Viseur et al. | 228/234.3 |

FOREIGN PATENT DOCUMENTS

| | | |
|---|---|---|
| JP | 2003520403 | 7/2003 |
| JP | 2005-291162 A * | 10/2005 |
| WO | 2008113653 | 9/2008 |

* cited by examiner

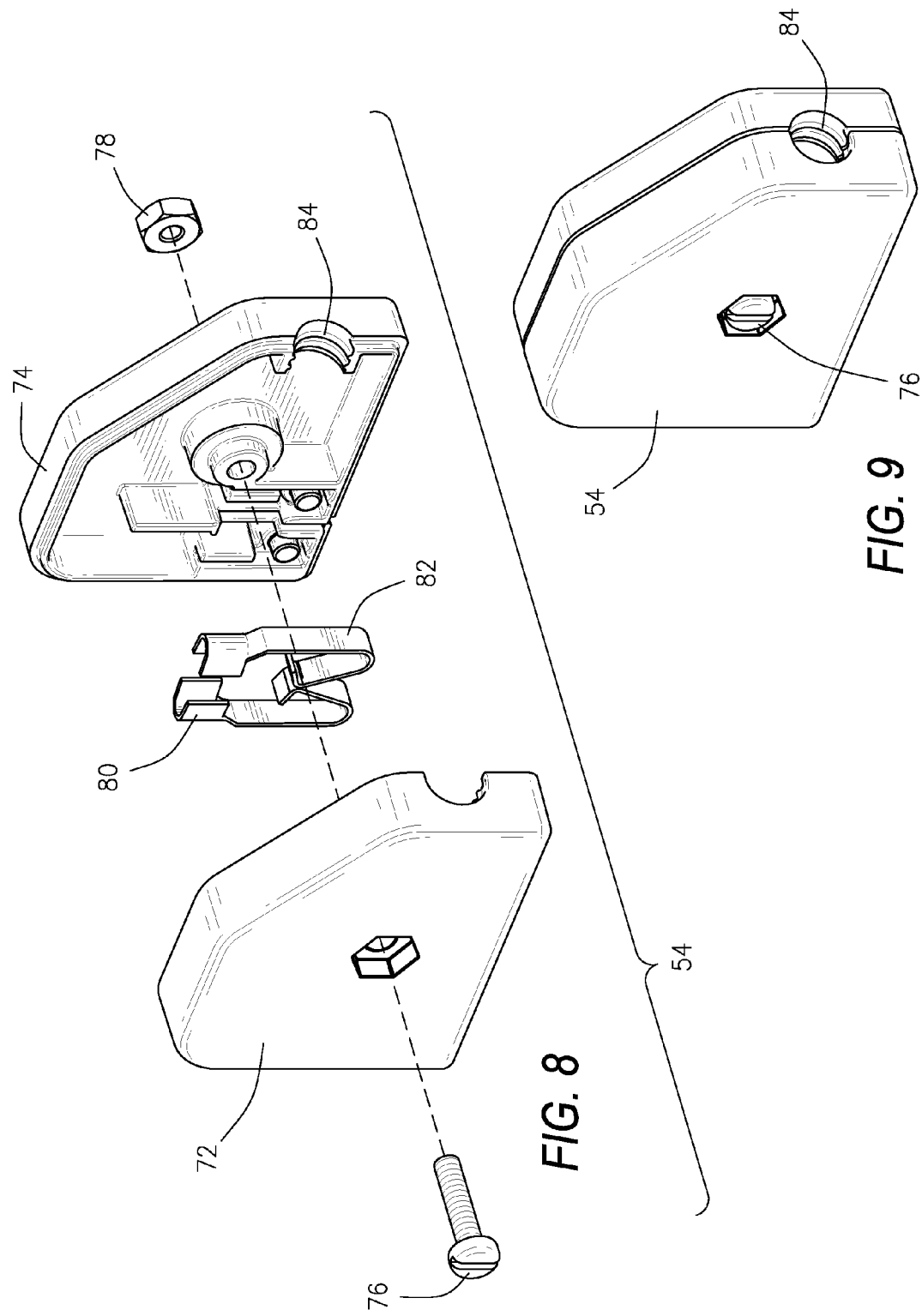

IGNITION SOURCE SYSTEM FOR AN EXOTHERMIC REACTION MOLD DEVICE

REFERENCE TO PENDING APPLICATION

This application is a continuation-in-part of U.S. patent application Ser. No. 12/632,417 filed Dec. 7, 2009, entitled "Alternative Ignition Source System for an Exothermic Reaction Mold Device".

BACKGROUND OF THE INVENTION

1. Field of the Invention

The present invention relates to an alternative ignition source system for an exothermic reaction weld mold device. In particular, the present invention is directed to an exothermic reaction weld mold device wherein alternate sources of ignition may be chosen and utilized for initiating an exothermic reaction for joining connectors.

2. Prior Art

The use of exothermic reaction welding is known for joining connectors to each other and also for joining other metal parts, such as ground rods.

A reusable mold contains an internal crucible in which an exothermic weld metal is placed. When the exothermic weld metal is ignited, an exothermic reaction results in the crucible. The weld metal liquefies and the molten material flows into a weld cavity in the mold.

The exothermic reaction process is initiated by an ignition which may occur from various sources. A spark or ignition gun, sometimes referred to as a flint igniter, is often used to start the exothermic reaction which takes place extremely quickly once ignited. One example of a mold ignited by a flint igniter is shown in Assignee's U.S. Pat. No. 6,776,386 entitled LID FOR EXOTHERMIC REACTION WELDING MOLD.

Alternatively, an electric ignition element having high resistance may be used to start the exothermic weld reaction. An electrical ignition system is advantageous in some cases since it may be initiated from a greater distance away from the mold itself.

Examples of prior exothermic molds that incorporate electrical ignition include Brosnan et al. (U.S. Pat. No. 4,889,324) which disclose exothermic welding with an ignition system having a pair of leads to connect to an ignition fuse or hot wire.

Another example is shown in Harger et al. (U.S. Pat. No. 6,994,244) which discloses an exothermic welding assembly including an electrical igniter which is embedded in the exothermic weld material.

Assignee's U.S. Pat. No. 7,240,717 discloses an electrical ignition source including an igniter element suspended above the lid of the mold device outside of the crucible.

The exothermic reaction weld is often times made in the field in remote locations and in all types of conditions. Accordingly, it is desirable to have a choice of ignition sources. Additionally, the weld may be made in confined spaces, such as an open trench, wherein a ground wire is being installed or a cable is being joined.

If electrical ignition tools are not present at the site, it would be desirable to have an alternate source to ignite the exothermic weld reaction. Alternatively, if spark ignition materials are not available at the site, it would be desirable to have an alternate source to initiate the exothermic reaction welding.

Accordingly, it is a principal object and purpose of the present invention to provide an alternate source exothermic reaction weld mold device.

It is a further object and purpose of the present invention to provide an exothermic reaction weld device that will accommodate various types of ignition systems.

It is a further object and purpose of the present invention to provide an ignition source system that may be used with a wide variety of existing molds and mold designs.

It is a further object and purpose of the present invention to provide an electronic thermal igniter assembly having an ignition body receivable through an opening in a lid of a mold wherein the ignition body is retained in an igniter plug.

SUMMARY OF THE INVENTION

The present invention is directed to an alternative ignition source system for an exothermic reaction mold device.

Exothermic welding is used for joining conductors mainly copper to copper, or copper to steel surfaces. The exothermic reaction takes place in a mold which is often made up of a graphite block and is able to withstand high exothermic temperature. A crucible which is the most important part of the mold is where the exothermic reaction takes place. A steel metal disk is placed in the crucible followed by the weld metal which is often a mixture of copper oxide and aluminum. Traditionally, starting powder is placed on top of the lid and the reaction is ignited using a flint igniter. The weld metal is a mixture of copper oxide and aluminum which produces copper and aluminum oxide after an exothermic reaction takes place.

The present invention includes a mold block and two alternate sources of ignition—an electronic thermal igniter assembly and a mechanically generated spark igniter.

The mold block also includes a mold cavity below the crucible which will receive molten material flowing from the exothermic reaction taking place in the crucible through a passageway.

A lid covers the open top of the mold block. The present invention may be utilized with lids of various types. In one preferred embodiment, the lid includes an upper top face with a cylindrical opening extending through the lid. The lid also includes a bottom or lower face opposed to the upper or top face. The bottom face includes an opening therethrough. An exhaust vent between the upper face and lower face of the lid forms a pocket in communication with the cylindrical opening and opening of the bottom face. The exhaust vent is vented through the side face of the lid.

In one of the alternate sources of ignition, the electronic thermal igniter assembly includes an extending ignition body which is receivable into and through the cylindrical opening in the lid and extends into the crucible until it is just above the level of exothermic weld material. The ignition body is retained in a recess in an igniter plug. The igniter plug contains a high temperature plastic hollow enclosure with flat metal spring contacts housed within. The metal spring contacts will tightly hold the ignition body in place in order to form a closed circuit. When installed, the igniter plug will rest against the top of the lid and close the opening in the lid when the ignition body is received therethrough. The ignition body and the igniter plug are, in turn, wired to a power source and a switch or switches.

BRIEF DESCRIPTION OF THE DRAWINGS

FIG. 8 illustrates an exploded perspective view of an igniter plug of the electronic thermal igniter assembly; and FIG. 9 illustrates a perspective view of the igniter plug shown in FIG. 8.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
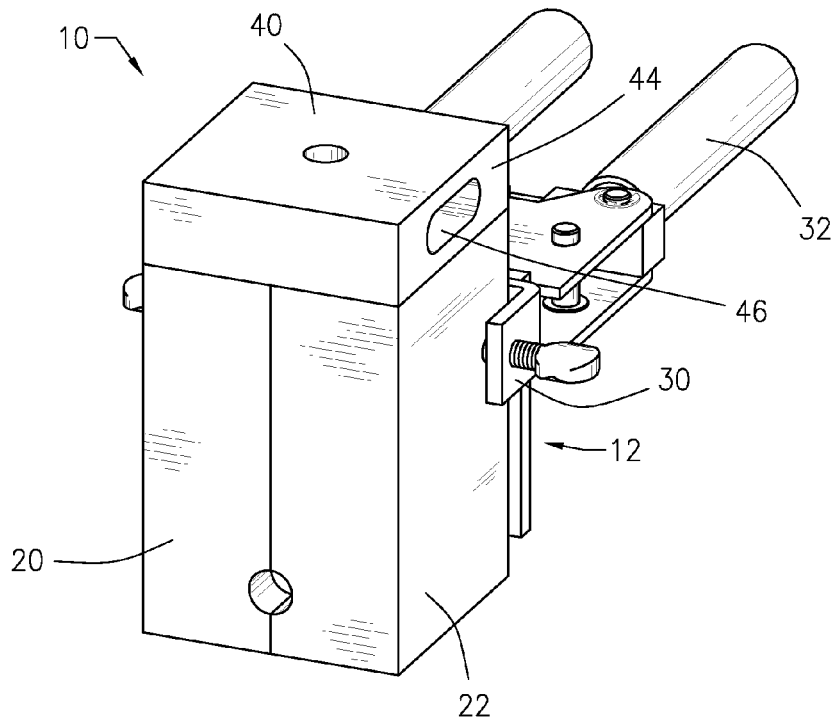
FIG. 1 illustrates a perspective view of alternative ignition source system for an exothermic reaction mold device constructed in accordance with the present invention.

Referring to the drawings in detail, FIG. 1 illustrates a perspective view of an alternative ignition source system for an exothermic reaction mold device 10 construction in accordance with the present invention.

The invention includes a mold block 12 and may permit two alternate forms of ignition an electronic thermal igniter assembly and a mechanically generated spark igniter.

Figure 2:
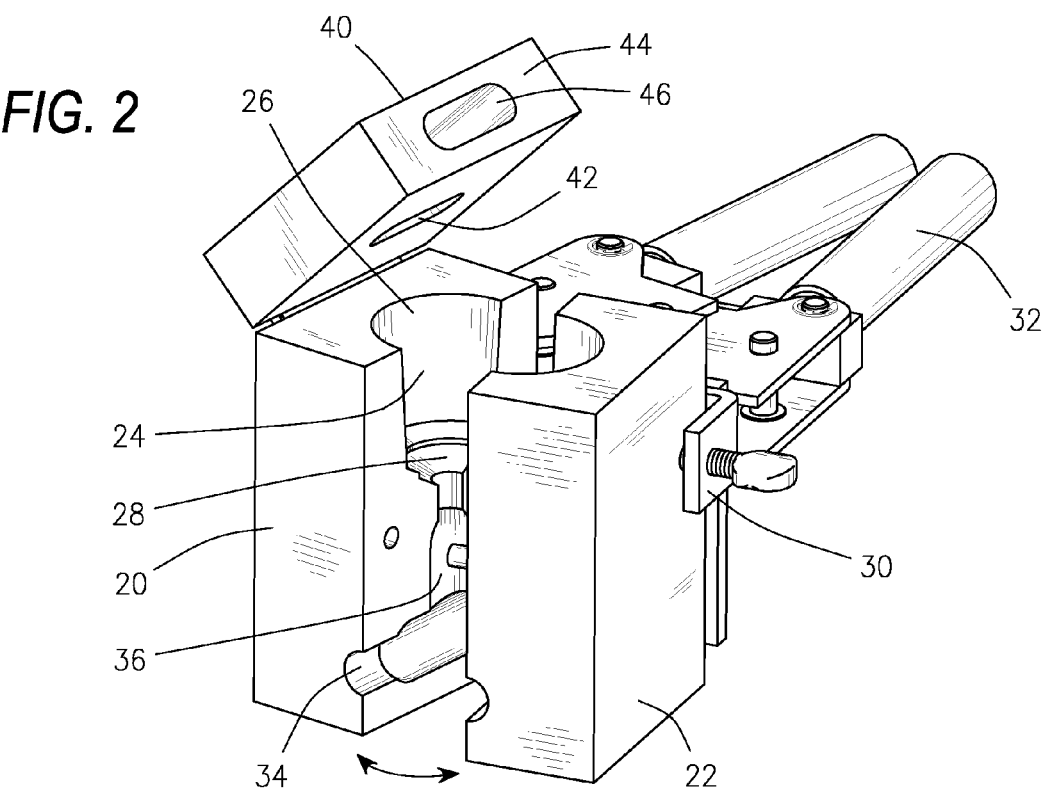
FIG. 2 illustrates a mold block of the present invention as shown in FIG. 1.

FIG. 2 illustrates a perspective view of the mold block 12 apart from the other components with the mold block opened for ease of viewing. The mold block which may be reused multiple times, and may be composed of graphite, ceramic or other refractory material.

Exothermic welding is used for joining conductors mainly copper to copper, or copper to steel surfaces. The exothermic reaction takes place in a mold which is made up a a graphite block and is able to withstand high exothermic temperature. A crucible which is the most important part of the mold is where the exothermic reaction takes place. A steel metal disk is placed in the crucible followed by the weld metal which is a mixture of copper oxide and aluminum. Traditionally, starting powder is placed on top of the lid and the reaction is ignited using a flint igniter. The weld metal is a mixture of copper oxide and aluminum which produces copper and aluminum oxide after an exothermic reaction takes place.

The present invention provides for alternative sources of ignition of the exothermic weld reaction. FIGS. 3 through 6 along with FIGS. 8 and 9 illustrate the use of the electronic thermal igniter assembly as an ignition source.

One type of mold block 12 is illustrated in the present embodiment although it will be understood that a wide variety of molds may be used within the teachings of the present invention. A first portion 20 of the mold device 12 joins with a second portion 22 of the mold device 12. When the portions 20 and 22 are joined together as shown in FIG. 1, a crucible 24 is formed having an open top 26 as seen in FIG. 2.

The base of the crucible 24 has a shoulder 28 to receive a small metal disk 18 such as a steel metal disk (not shown in FIG. 2).

Clamps 30 retain the mold portions 20 and 22 so that they may move between a closed position shown in FIG. 1 and an open position shown in FIG. 2. Handles 32 extending from the clamps 30 may be utilized to move the clamps 30 and, in turn, move the mold portions.

The mold block 12 also includes a mold cavity 34 below the crucible 24 which will receive molten material flowing from the exothermic reaction taking place in the crucible 24 through a passageway 36.

A lid 40 covers the open top 26 of the mold block 12. The lid 40 may be connected by a hinge or hinges to the mold block 12. It will be understood that the present invention may be used with lids of various types. In one preferred embodiment, the lid 40 includes an upper or top face with a cylindrical opening 38 extending through the lid 40. The lid also includes a bottom or lower face opposed to the upper or top face. In the present embodiment, the upper top face is parallel to the bottom face. The bottom or lower face includes an opening 42 therethrough. The opening 42 may be elliptical oval, or take other shapes. The cylindrical opening 38 has an axis perpendicular to both the top and the bottom faces and passes through the opening 42. Between the top face and the bottom face of the lid 40 are a series of side faces including a side face 44. An exhaust vent 46 between the upper face and the lower face of the lid forms a pocket in communication with the cylindrical opening 38 and the opening 42 of the bottom face. The exhaust vent 46 is vented through the side face 44 of the lid 40.

The cylindrical opening 38 also includes a counter sunk receptacle 48 in the top face which is used to retain a portion of starting powder when utilizing the mechanically generated spark igniter as an ignition source.

Figure 3:
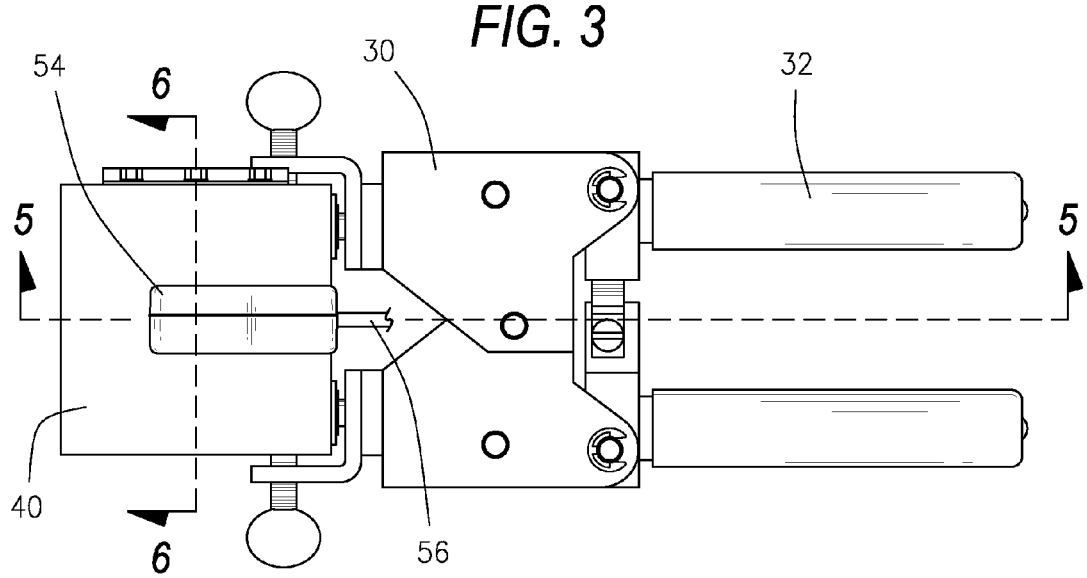
FIG. 3 shows a top view of the invention shown in FIG. 1 utilizing an electronic thermal igniter assembly as an ignition source.
Figure 4:
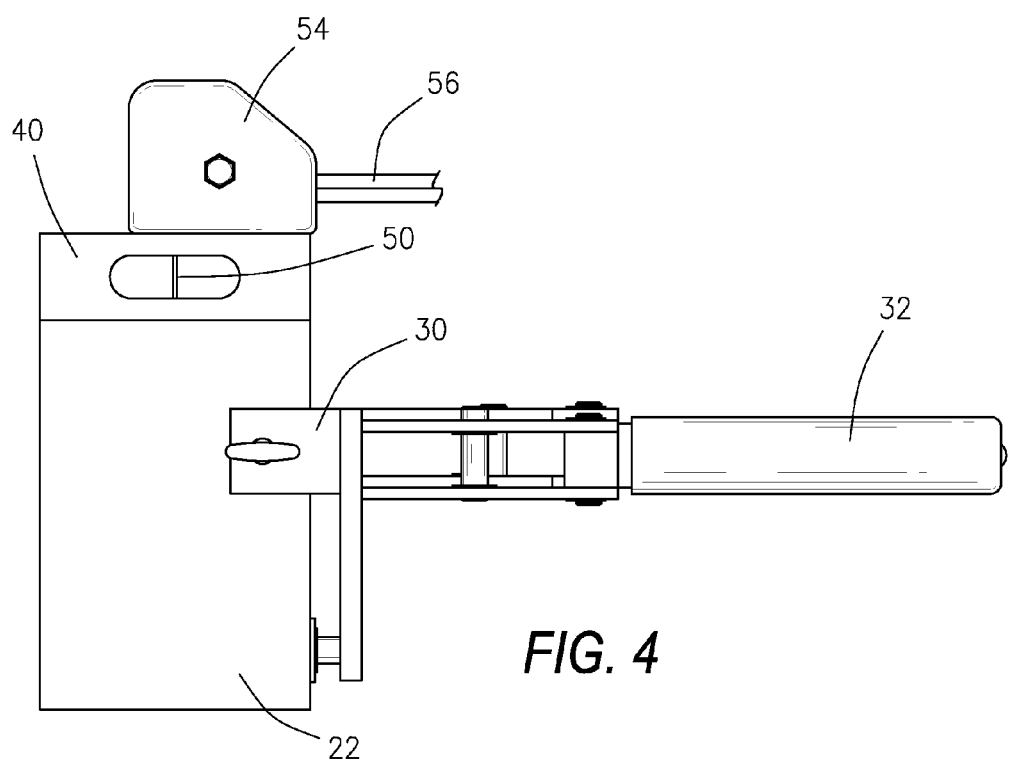
FIG. 4 illustrates a side view of the invention shown in FIG. 3.
Figure 5:
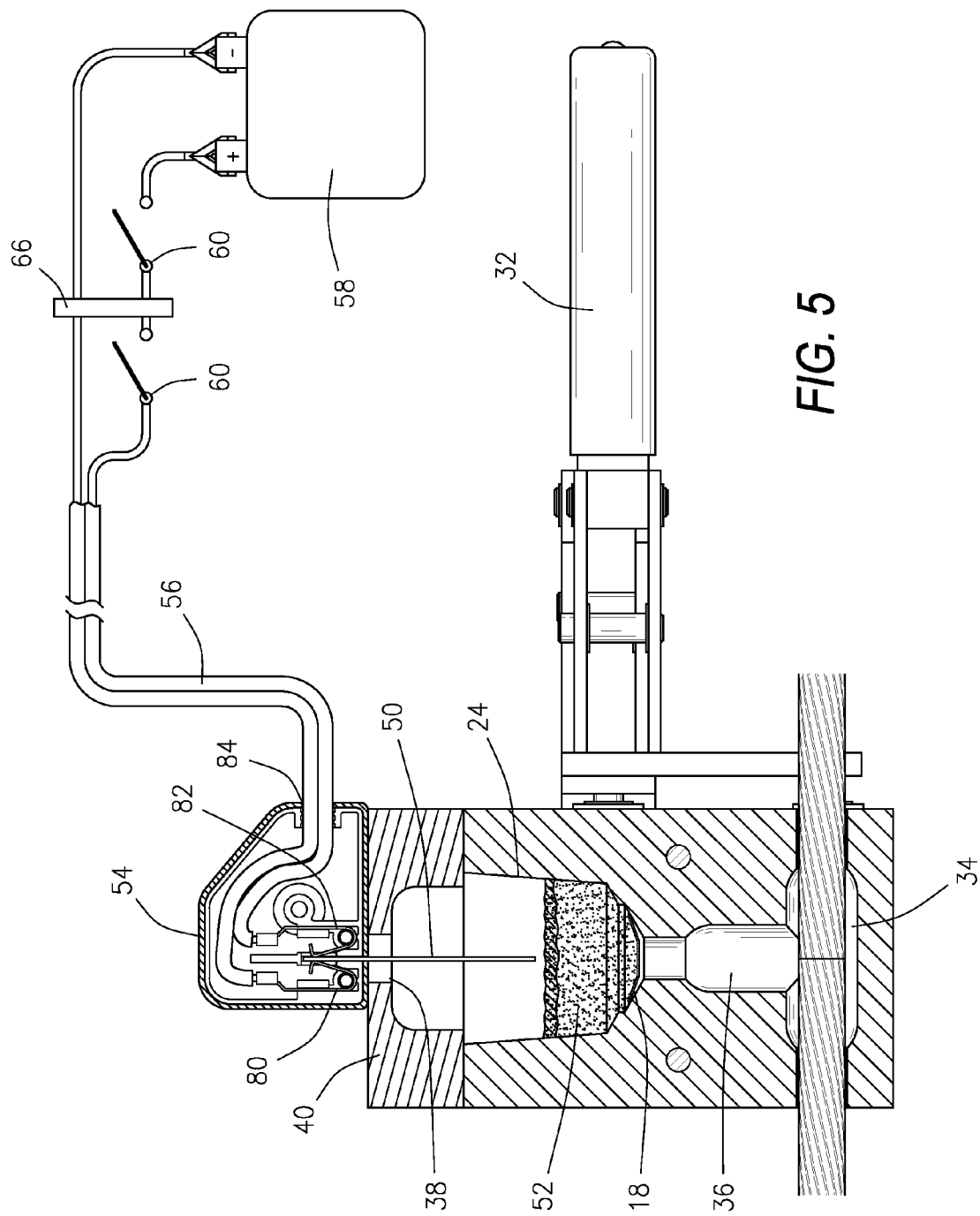
FIG. 5 illustrates a sectional view taken along line 5-5 of FIG. 3.
Figure 6:
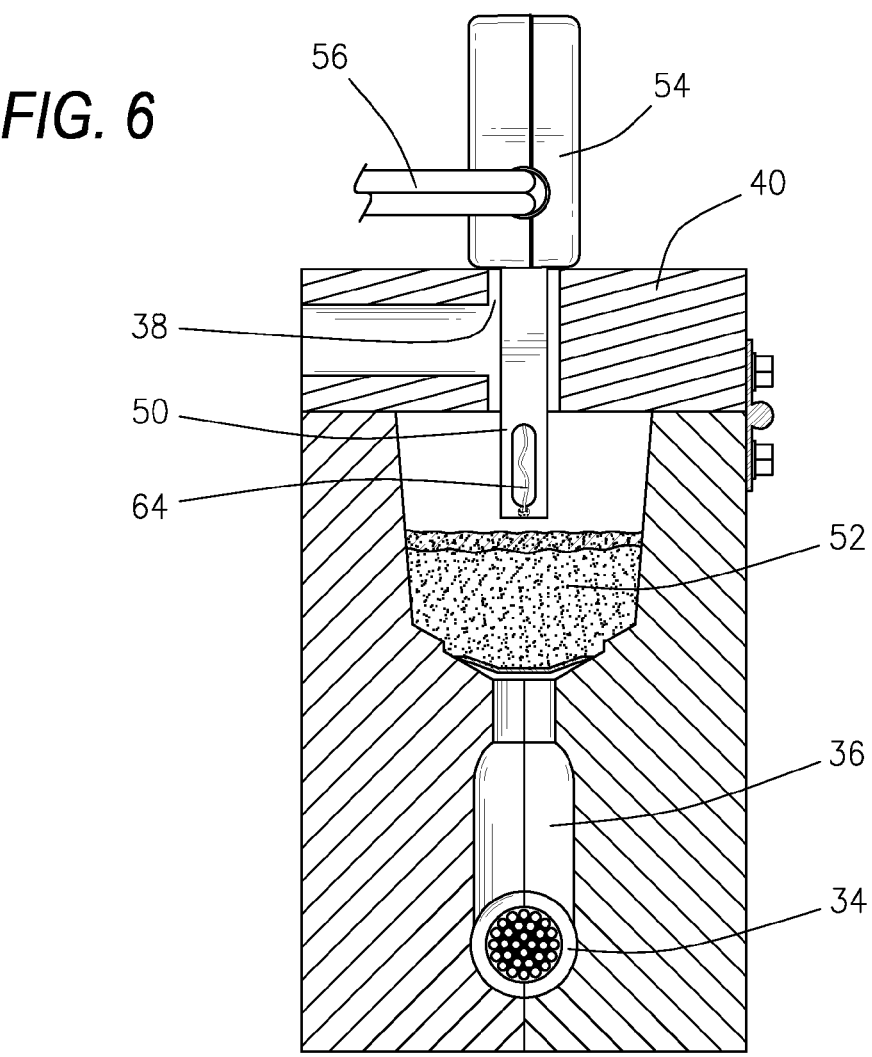
FIG. 6 illustrates a sectional view taken along line 6-6 of FIG. 3.

The present invention employs alternative ignition sources in order to initiate an exothermic reaction. A first ignition source is a remotely activated electronic thermal igniter assembly while a second, alternate ignition source is a mechanically generated spark. FIG. 3 shows a top view, FIG. 4 illustrates a side view, FIG. 5 illustrates a sectional view and FIG. 6 illustrates a sectional view of the invention with the electronic thermal igniter assembly employed. FIGS. 8 and 9 show an exploded perspective and perspective view of the igniter plug to create the ignition spark within the electronic thermal igniter assembly, respectively.

The electronic thermal igniter assembly includes an extending flat blade ignition body 50 which may be seen apart from the mold block 12 in FIG. 1. The ignition body 50 includes a strip or wire of two different metallic elements in contact with each other. In one non-limiting example, the metallic elements are palladium and aluminum. When an electrical charge is applied the elements will alloy. The electronic ignition body 50 is receivable into and through the cylindrical opening in the lid 40. When installed, the ignition body 50 extends into the crucible 24 until it is just above the level of exothermic weld material 52, as best seen in FIGS. 5 and 6.

The ignition body 50 is not and should not be in contact with the exothermic weld material as the ignition body works more effectively when suspended above the weld metal. When ignition is initiated, the sparks generated from the ignition body broadcast more evenly over the weld material producing a more consistent and even reaction of the weld material.

The ignition body 50 is inserted into a recess in the igniter plug 54 and is replaceable each time an exothermic reaction is desired. The ignition body 50 is retained in a recess in an igniter plug 54. The igniter plug 54 is an embodiment built of high temperature material that contains two outer components, 72 and 74, as can be seen in FIG. 8. The two outer components 72 and 74 are preferably designed of high temperature plastic to sustain the extreme heat that the ignition emits. The two outer components 72 and 74 are assembled together and secured with a screw 76 and nut 78 to form a hollow housing around the spring contact mechanism, as shown in FIGS. 8 and 9. The outer shell could be designed to be secured with a heat resistant latch to tightly enclose the housing. The housing needs to be hollow to create a void space for the spring contact mechanism 80 and 82, to latch into place. The outer components 72 and 74 could also be formed of graphite or some other type of metal. Also, the igniter plug 54 is a very robust unit that is meant to be used multiple times before being replaced out in the field.

Unlike past designs that contain twisted copper wires as a pair of conductors, the spring contact mechanism consists of two flat metal body igniter contacts, 80 and 82, as shown in FIGS. 5 and 8. The igniter contacts 80 and 82 are made of metal so they act as a pair of conductors for the electrical current to run through the ignition body 50. The spring contact mechanism 80 and 82 resides within either side of the two housing components 72 and 74, as shown in FIG. 8. The inner part of the housing components 72 and 74 contain a custom fit in the shape of the spring contacts with two shoulders so that spring contacts 80 and 82 can properly fit within the housing unit. The spring contacts 80 and 82 form a confined spacing between each other that is smaller than the distance of the width of the ignition body 50. This forms a friction-less receptacle for the ignition body 50 to be retained in a recess, as shown in FIG. 5.

Each open end of the igniter contacts 80 and 82 is connected via the lead wire 56, which have been soldered and crimped onto each spring contact, to a voltmeter assembly in the remote unit 58, as shown in FIG. 5. Ignition body 50 enters the spring contacts 80 and 82 through the spacing between the closed ends, as shown in FIG. 5. The closed ends at the bottom of the spring contacts 80 and 82 form the clamp to hold the ignition body 50 tightly in place. In order to prevent an accidental melt of the fuse from the voltmeter assembly, the closed ends of the igniter contacts 80 and 82 do not touch each other. This accidental melt could occur if the operate button is pushed without the presence of the igniter body 50, creating a high safety risk. The ignition body 50 fits tightly in between the spring contacts in order to form a complete, closed circuit, as shown in FIG. 5.

The igniter body 50 includes a printed circuit board insulated on all sides with an ignition component 64 in the form of a metallic wire soldered to the board to complete the circuit. The ignition component 64 spans an opening in the ignition body 50 and may be configured as a straight wire, as a loop or another configuration.

Once installed, the igniter plug 54 will rest against the top of the lid 40 and substantially closes the central opening in the lid 40 when the ignition body 50 is received therethrough. The flat base of the igniter plug 54 enables it to rest against the top of lid 40. This flat base is important because it provides adequate protection from the exothermic reaction and sparks generated within the ignition source system. The flat base of igniter plug 54 substantially covers the Opening in the lid and acts as a seal, as shown in FIG. 5.

The igniter contacts 80 and 82 within the igniter plug 54 are connected via the lead wire 56, through the opening 84 within the external housing unit, to a battery or multiple batteries or to another power source 58 and a switch or switches 60, as shown in FIG. 5. The lead wire 56 is surrounded by thick insulation, thus providing an adequate seal within the opening 4 in the ignition plug 54. The lead wire 56 from the ignition plug 50 to the remote unit 58 has the option of being replaced out in the field, thus making it easier for the user to manually fix the assembly. In one non-limiting configuration, an arming and an operation switch may be employed. An optional battery life voltage sensing indicator 60 with a voltage sensing circuit may be included. The ignition plug 54 may be easily assembled and disassembled for maintenance, inspection, or repair.

The replaceable ignition body 50 is designed so that the same size component is used for the smallest weld shot to the largest weld shot.

The batteries 58 may be standard replacement alkaline batteries and may be contained in a housing with the switch or switches 60 in a portable, handheld device so that the exothermic reaction is initiated remotely from the mold device 12.

In order to utilize the present invention, a cable, cables or other components to be welded are positioned in the mold cavity 34 and a metal disk 18 is inserted into the crucible 24. Exothermic weld material 52 is placed in the crucible and, optionally, a portion of starting powder is sprinkled on top of the exothermic reaction material. Thereafter, the lid 40 is closed covering the open top. The ignition body 50 is then inserted through the cylindrical opening 38 of the lid until the igniter body rest against the top of the lid 40. Once the switch or switches 60 are activated, electricity is delivered through the wires to a printed circuit board in the igniter body and to the ignition body 50. In one embodiment, a first arming switch and a second ignition switch are used. The ignition body 50 will generate heat causing sparks or discreet particles to fall onto the exothermic weld material and/or starting powder causing the weld material 52 to turn into molten liquid material. The igniter plug 54 blocks escaping gases from venting out of the top of the lid. The metal disk 18 will be melted, causing the molten material to flow through the passageway 36 into the mold cavity 34 forming an electrical connector in the cavity.

Use of the electronic thermal igniter assembly provides an easy and safe method of initiating an exothermic weld.

As an alternate ignition source, a mechanical spark may be utilized. Once again, the connector or connectors are inserted into the mold cavity 34, a metal disk 18 is placed in the mold block 12 and exothermic weld material 15 is inserted into the crucible in the block. Thereafter, the lid 40 is closed. A portion of starting powder is placed in the counter sunk receptacle in the top of the lid 40. A spark may be mechanically generated by use of a flint igniter brought near the starting powder. The starting powder will initially be ignited which will cause sparks to pass through the cylindrical opening 38 into the crucible which will cause the exothermic weld material to be reduced. The metal disk 18 will be melted, causing the molten material to flow through the passageway 36 into the mold cavity.

Figure 7:
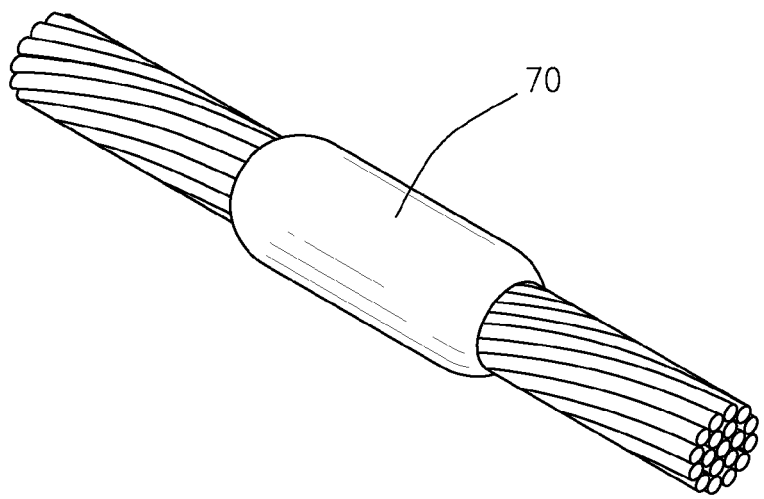
FIG. 7 illustrates a completed weld performed by use of the present invention.

FIG. 7 illustrates a completed connector 70 formed by the present invention.

In the case of either of the ignition sources, the exhaust vent through the side of the lid 40 forms a vent for hot, escaping gases from the exothermic reaction.

Whereas, the present invention has been described in relation to the drawings attached hereto, it should be understood that other and further modifications, apart from those shown or suggested herein, may be made within the spirit and scope of this invention.

What is claimed is:

1. An ignition source system for an exothermic reaction mold device, which system comprises:
    a crucible in a block with an open top so that said crucible receives an exothermic weld material;
    a lid covering said open top wherein said lid has an opening therethrough;
    an electronic thermal igniter assembly having an ignition body, said ignition body receivable through said opening in said lid so that said exothermic weld material may be ignited by said electronic thermal igniter assembly; and
    an igniter plug having a connector housing unit with a spring contact mechanism for capturing said ignition body wherein said ignition body is retained in a recess of said igniter plug.

2. An ignition source system for an exothermic reaction mold device as set forth in claim 1 wherein said components of the housing unit is made of high temperature plastic.

3. An ignition source system for an exothermic reaction mold device as set forth in claim 1 wherein said housing unit has a flat base to rest against said lid and seal the mold device.

4. An ignition source system for an exothermic reaction mold device as set forth in claim 1 wherein said spring contact mechanism is composed of two metal spring contacts.

5. An ignition source system for an exothermic reaction mold device as set forth in claim 4 wherein insulated wires are soldered onto open ends of said metal spring contacts.

6. An ignition source system for an exothermic reaction mold device as set forth in claim 5 wherein said insulated wires are connected through a small opening within the housing unit to a voltmeter assembly, including at least one battery and at least one switch, in a remote unit.

7. An ignition source system for an exothermic reaction mold device as set forth in claim 4 wherein ends of said flat metal spring contacts form a tight spacing that is a smaller distance than the width of the ignition body.

8. An ignition source system for an exothermic reaction mold device as set forth in claim 7 wherein said closed ends of the metal spring contacts firmly hold the ignition body in the spacing between the spring contacts.

9. An ignition source system for an exothermic reaction mold device as set forth in claim 4 wherein said spring contacts accept an insulated printed circuit board designed within said ignition body.

10. An electronic thermal igniter assembly for an exothermic reaction mold device, which assembly comprises:
    a receivable thermal ignition body;
    an igniter plug having a connector housing unit retaining a spring contact mechanism, which captures said ignition body.

11. An electronic thermal igniter assembly for an exothermic reaction mold device as set forth in claim 10 wherein said ignition body includes an insulated printed circuit board.

12. An electronic thermal igniter assembly for an exothermic reaction mold device as set forth in claim 10 wherein said components of said housing unit are made of high temperature plastic.

13. An electronic thermal igniter assembly for an exothermic reaction mold device as set forth in claim 10 wherein said spring contact mechanism is composed of two metal spring contacts.

14. An electronic thermal igniter for an exothermic reaction mold device as set forth in claim 13 wherein insulated wires are soldered onto open ends of said flat metal spring contacts.

15. An electronic thermal igniter for an exothermic reaction mold device as set forth in claim 14 wherein said insulated wires are connected through a small opening within the housing unit to a voltmeter assembly, including at least one battery and at least one switch, in a remote unit.

16. An electronic thermal igniter assembly for an exothermic reaction mold device as set forth in claim 13 wherein ends of said flat metal spring contacts form a tight spacing that is a smaller distance than the width of the ignition body.

17. An electronic thermal igniter for an exothermic reaction mold device as set forth in claim 16 wherein said ends of said flat metal spring contacts firmly hold the ignition body in the spacing between the spring contacts.

18. An electronic thermal igniter for an exothermic reaction mold device as set forth in claim 13 wherein said spring contacts accept an insulated printed circuit board designed within said ignition body.

* * * * *